US008589341B2

(12) United States Patent
Golde et al.

(10) Patent No.: US 8,589,341 B2
(45) Date of Patent: Nov. 19, 2013

(54) INCREMENTAL TRANSPARENT FILE UPDATING

(75) Inventors: Ittai Golde, Richon le Zion (IL); Kobi Ben Tzi, Ramat Hasharon (IL); Oron Vexler, Givat Shmuel (IL); Itzhak Pomerantz, Kfar Saba (IL)

(73) Assignee: Sandisk IL Ltd., Kfar Saba (IL)

( * ) Notice: Subject to any disclaimer, the term of this patent is extended or adjusted under 35 U.S.C. 154(b) by 532 days.

(21) Appl. No.: 11/944,639

(22) Filed: Nov. 26, 2007

(65) Prior Publication Data
US 2008/0134163 A1 Jun. 5, 2008

Related U.S. Application Data

(60) Provisional application No. 60/868,361, filed on Dec. 4, 2006.

(51) Int. Cl.
G06F 7/00 (2006.01)
G06F 17/00 (2006.01)

(52) U.S. Cl.
USPC ..... 707/610; 707/640; 707/661; 707/999.204

(58) Field of Classification Search
None
See application file for complete search history.

(56) References Cited

U.S. PATENT DOCUMENTS

| 5,537,636 | A | | 7/1996 | Uchida et al. |
| 5,897,642 | A | * | 4/1999 | Capossela et al. ..................... 1/1 |
| 5,907,673 | A | * | 5/1999 | Hirayama et al. ............... 714/16 |
| 6,021,408 | A | | 2/2000 | Ledain et al. |
| 6,374,268 | B1 | * | 4/2002 | Testardi .......................... 707/822 |
| 6,405,316 | B1 | * | 6/2002 | Krishnan et al. ............... 713/190 |
| 7,120,767 | B2 | * | 10/2006 | Hara et al. ...................... 711/161 |
| 7,155,711 | B2 | * | 12/2006 | Vogel et al. .................... 717/169 |
| 7,401,192 | B2 | * | 7/2008 | Stakutis et al. ............... 711/162 |
| 2002/0070753 | A1 | | 6/2002 | Vogel et al. |
| 2003/0050940 | A1 | * | 3/2003 | Robinson ...................... 707/204 |
| 2003/0158869 | A1 | * | 8/2003 | Micka ........................... 707/203 |
| 2003/0191743 | A1 | * | 10/2003 | Brodersen et al. ................. 707/1 |
| 2004/0044930 | A1 | * | 3/2004 | Keller et al. ...................... 714/48 |
| 2004/0073665 | A1 | * | 4/2004 | Fujiwara et al. ............... 709/224 |
| 2004/0260898 | A1 | * | 12/2004 | Stanley et al. ................ 711/162 |
| 2004/0267899 | A1 | * | 12/2004 | Rahman et al. ............... 709/217 |

(Continued)

FOREIGN PATENT DOCUMENTS

| JP | 63036375 A | 2/1988 |
| JP | 63318646 A | 12/1988 |

(Continued)

OTHER PUBLICATIONS

Saito Y: "Consistency Management in Optimistic Replication Algorithms".
Office Action dated Nov. 22, 2010 issued in Chinese Patent Application No. 200780044443.9 with English translation, 11 pages.

(Continued)

*Primary Examiner* — Azam Cheema
(74) *Attorney, Agent, or Firm* — Toler Law Group, PC

(57) ABSTRACT

A system and method to protect a target file from data damage wherein a wrapper application transparently intercepts a write call operative to affect the target file and stores the pertinent data in a delta file. Occasionally the target file is backed up in a temporary file and then updated. The wrapper application also intercepts a read call operative to access the target file and merges the update information with data from the target file in a temporary file. The resulting merged data is returned as read results data.

30 Claims, 5 Drawing Sheets

(56) References Cited

U.S. PATENT DOCUMENTS

| | | | |
|---|---|---|---|
| 2005/0022175 A1* | 1/2005 | Sliger et al. | 717/169 |
| 2005/0114672 A1* | 5/2005 | Duncan et al. | 713/182 |
| 2005/0132382 A1 | 6/2005 | McGuire et al. | |
| 2005/0289152 A1 | 12/2005 | Earl | |
| 2006/0106893 A1* | 5/2006 | Daniels et al. | 707/204 |
| 2007/0288715 A1* | 12/2007 | Boswell et al. | 711/164 |
| 2008/0196019 A1* | 8/2008 | Meller et al. | 717/168 |

FOREIGN PATENT DOCUMENTS

| | | |
|---|---|---|
| JP | H03-078043 A | 4/1991 |
| JP | H04-156627 A | 5/1992 |
| JP | H05-342817 A | 12/1993 |
| JP | 07110810 A | 4/1995 |
| JP | 9-506453 | 6/1997 |
| JP | 10143412 A | 5/1998 |
| JP | 2000082004 A | 3/2000 |
| JP | 2003-503792 A | 1/2003 |
| JP | 2003131949 A | 5/2003 |
| WO | WO86/01018 | 2/1986 |
| WO | 9516237 A1 | 6/1995 |
| WO | 0101251 A1 | 1/2001 |

OTHER PUBLICATIONS

International Search Report and the Written Opinion of the International Searching Authority for International Application No. PCT/IL2007/001479, Oct. 15, 2008, 15 pages.

International Preliminary Report on Patentability for International Application No. PCT/IL2007/001479, Jun. 10, 2009, 7 pages.

Office Action dated Sep. 6, 2011 issued in Chinese Patent Application No. 200780044443.9, with English translation, 11 pages.

Office Action dated Sep. 9, 2011 issued in Taiwanese Patent Application No. 096145944 with English translation, 14 pages.

Third Office Action issued Apr. 28, 2012 in Chinese Patent Application No. 200780044443.9 with English translation, 7 pages.

Notification of Reasons for Refusal issued in Japanese Application No. 2009-538853 on Oct. 2, 2012, with English translation, 4 pages.

Decision of Refusal issued Mar. 12, 2013 in Japanese Application No. 2009-538853, with English translation, 4 pages.

Miwa, Yoshihisa, "Now and Feature of CD-ROM and MO," Nikkei Byte, No. 129, Japan, Nikkei Business Publications, Inc., Sep. 1, 1994, pp. 136-146.

Office Action issued Apr. 15, 2013 in Taiwanese Application No. 096145944, with English translation, 15 pages.

Office Action issued in Taiwanese Application No. 096145944 on Nov. 23, 2012, with English translation, 19 pages.

* cited by examiner

INCREMENTAL TRANSPARENT FILE UPDATING

This patent application claims the benefit of U.S. Provisional Patent Application No. 60/868,361, filed Dec. 4, 2006

FIELD AND BACKGROUND OF THE INVENTION

Various methods and systems to protect a target file from damage are possible, and particularly, methods and systems may prevent data damage that occurs due to disruption while the target file is open for writing.

Flash memory devices are very well known in the art of computer engineering.

The normal way of storing information in such memories is in data files that are managed by the operating system.

It is a known property of flash storage systems that a data file is vulnerable to data damages if certain unexpected events, such as power failures or software crashes, occur while the file is open for writing. This poses a severe problem because writing into a file is routinely necessary, and a file must be open for writing in order for it to be updated.

Solutions have been developed for software applications to handle files in special ways that reduce the risk. Such solutions can be seen in many word processing applications, which periodically makes a backup copy of open files. Alternatively, a fix utility runs post-effect, when corruption of the file has been detected. However, such solutions are application dependent, slowing down the development of applications, and are a source of other types of problems due to programming errors. Furthermore, when a running application is protecting an original version of a file and also keeping an updated temporary copy, there arises a problem of access conflicts (if a different application calls the file, which file will it access?). This requires inconvenient locking of files. Protection methodologies are also available for system-wide file protection schemes, which constantly update permanent backup copies of an entire data storage device or particular important data. Keeping a permanent back up requires significant data storage space and system resources to constantly check and update files.

There is thus a widely recognized need for, and it would be highly advantageous to have, a solution that allows any application to use any data file without the risk that the file will be damaged due to the above-mentioned causes and without keeping a permanent back up copy.

SUMMARY OF THE INVENTION

Various methods and systems to protect a target file from data damage are possible, and particularly, methods and systems may prevent data damage that occurs due to disruption while the target file is open for writing.

An embodiment of a system for storing a target file and protecting the target file from data damage may include: a) a processor configured to retrieve and execute program code of a wrapper application including: i) code for intercepting at least one file command issued by a second application, the at least one file command being operative to affect the target file, ii) code for saving update information pertinent to the at least one file command, and iii) code for updating the target file with the update information; b) a first memory space for storing the target file, and c) a second memory space for storing the update information. The wrapper application may be independent from the second application issuing the file command.

In an embodiment of a computer readable storage medium having computer readable code embodied thereon, the computer readable code for protecting a target file from data damage, the computer readable code may include: a) program code for intercepting at least one file command issued by an application and operative to affect the target file; b) program code for saving update information pertaining to the at least one file command without modifying the target file, and c) program code for updating the target file with the update information. The computer readable code may be independent of the application issuing the command.

An embodiment of a method of employing a wrapper program to protect a target file from data damage, may include the steps of: a) intercepting by the wrapper program of at least one file command operative to affect the target file and issued by an application, the step of intercepting being transparent to the application; b) saving update information pertaining to the at least one file command without altering the target file, and c) updating the target file with the update information.

An embodiment of a system for reading data from a protected target file may include a processor configured to retrieve and execute program code of a wrapper application including: code for intercepting at least one file command issued by an application independent of the wrapper application, the file command operative to access the protected target file, and code for reading update information pertaining to the file command. The system may also include a first memory space for storing the protected target file and a second memory space for storing the update information.

An embodiment of a method of employing a wrapper program to read a protected target file may include the step of: intercepting by the wrapper program of at least one file command issued by an application, the file command operative to access the protected target file. The step of intercepting may be transparent to the application. The method may also include the step of reading from a delta file update information pertaining to the at least one file command. The delta file may be separate from the protected target file. The method may further include the steps of merging data from the target file with the update information and returning the merged data as a response to the file command.

An embodiment of a system for storing a target file and protecting the target file from data damage may include a first memory space for storing the target file. The system may also include a second memory space for storing update information pertaining to at least one file command operative to affect the target file. The system may also include a processor configured to retrieve and execute program code of a wrapper application including code for intercepting the at least one file command operative to affect the target file, code for saving the update information to the second memory space and code for updating the target file with the update information. The wrapper program may be independent of the application issuing the file command.

In the system for storing a target file, the first memory space may reside in a nonvolatile memory of a data processing device. In some embodiments of the system, the second memory space may reside in the same nonvolatile memory as the first memory space, with the target file and the update information being stored in separate locations in the memory. In other embodiments, the second memory space may reside in a volatile memory of the data processing device. In other embodiments, the second memory space may reside in a memory (volatile or nonvolatile) of a data storage device.

In the system for storing a target file, the first memory space may reside in a nonvolatile memory of a portable data storage device. Examples of portable data storage devices include a removable medium (for example a magnetic disk or an optical disk) or a portable drive (for example a flash disk, an external hard drive or a smart-card). In some embodiments, the second memory space may reside in the same memory as the first memory space, with the target file and the update information being stored in separate locations in the memory. In other embodiments, the second memory space may reside in a memory (volatile or nonvolatile) of a data processing device. In other embodiments, the second memory space may reside in a volatile memory of the portable data storage device.

In the system for storing a target file, the update information may include only data pertaining to the at least one file command. Particularly, the update data, the second memory space and the delta file may not contain data copied from the target file. Thus, even after a command issued by the application and operative to affect the target file has been stored, there would remain only one copy of the data in the target file (the copy of the data of the target file is stored only in the first memory space) and one copy of the update information pertinent to the stored file command (the data pertinent to the stored file command is stored only in the second memory space). Only after a merge event would a second copy of data from the target file be placed into a temporary file.

An embodiment of a system for storing a target file may further include a third memory space for storing a temporary file and the wrapper application may further include code for copying at least part of the target file into the temporary file. In alternative embodiments, the temporary file is an independent file or a temporarily allotted location in an existing file or a temporarily allotted location in a volatile memory. The wrapper application may also further include code for applying the stored update information to the temporary file to produce an updated version of the target file. The wrapper application may also further include code for replacing part of the target file with the temporary file. According to an alternative embodiment the third memory space may reside in the same memory as the first memory space. In another alternative embodiment the third memory space may reside in the same memory as the second memory space. In a further alternative embodiment, the third memory space may reside in any one of the memories listed above. Thus, it is understood that the third memory space could reside in a volatile or nonvolatile memory of a data processing device or of a data storage device and each alternative location for the third memory space may be in combination with each of the alternative locations of the first and second memory spaces.

An embodiment of a computer readable storage medium having embodied thereon computer readable code for protecting a target file from data damage may include program code for intercepting at least one file command issued by an application, the program code being independent from the application issuing the file command. In an embodiment described below, the program code can be executed separately from any particular application and intercepts file commands from an arbitrary application. The file command is operative to affect the target file. Program code may also be included for saving update information pertaining to the file command without modifying the target file and for updating the target file with the update information. In alternative embodiments, the code may specify that the updating is to be carried according to a fixed time schedule or that the updating is to be carried out in response to one or more termination events or that the updating is to be carried out according to a combination of a fixed time schedule and one or more termination events. Examples of a computer readable medium may include, a ROM contained in a portable storage device or a removable media (for example a CD) included in a package sold with a storage device. Alternatively, the computer readable medium may be a hard disk installed on a server accessible over the Internet. The program code may serve as a stand-alone program to protect data on one or more arbitrary storage devices. Alternatively, the code may be included in a driver program for execution on a data processing device, the driver program serving as an interface between the data processing device and a data storage device. Alternatively the code may be incorporated into an operating system or into a file server application. In a further possible alternative embodiment, the code is executed by a processor internal to a data storage device.

An embodiment of the program code for intercepting the file command and saving the update information may make the intercepting and saving contingent upon one or more conditions. For example the intercepting and saving may be performed only when the application issuing the command is one of a plurality of "included" applications. In the context of the description herein, an "included" application, may be defined as an application that has been designated as one from which the wrapper program is to intercept a file command to modify the target file (generally the included applications are applications that store important files without power out protection [for example Microsoft Visual Studio®]). In an alternative example, the file command may be intercepted and the update information saved if the file command is issued by an application that is not an "excluded" application. In the context of the description herein, an "excluded" application, may be defined as an application that has been designated as one from which the wrapper program is not to intercepts a file command to modify the target file (for example Microsoft Word® may be an excluded application since it has its own automatic file protection or Microsoft Internet Explorer® may be excluded because it saves a large number of temporary files but does not generally save user modified files). In an alternative example, the file command may be intercepted and the update information saved if the file command is operative to affect a file that is not a temporary file. In an alternative example, the file command may be intercepted and the update information saved if the file command is operative to affect a file belonging to an "included" file type. In the context of the description herein, an "included" file type may be a type of file that has been designated to be protected by the wrapper application [for example a .txt file may be an included file type]. In an alternative example, the file command may be intercepted and the update information saved if the file command is operative to affect a file not belonging to an "excluded" file type. In the context of the description herein, an "excluded" file type may be a type of file that has been designated to not be protected by the wrapper application [for example .doc and .tmp file types may be excluded] and in an alternative example, the file command may be intercepted and the update information saved if the file command is operative to affect a file stored in an included storage device. In the context of the description herein, an included device may be defined as a device designated for protection, such that a file on the included device is to be protected.

An embodiment of the computer readable code may further include code to intercept every write command that is operative to affect the target file after the code for saving is executed and until the code for updating is executed.

An embodiment of the computer readable code may further include code for detecting a termination event and for updating the target file with the update information upon detection of the termination event. Some examples of termination events may include an issuing of a command to close the target file, a closing down of an application that accessed the target file, an occurrence of a condition dependent on a statistic related to a plurality of file commands [for example if eighty percent of the file commands issued to the target file change less than 10 Kbytes of data, then a termination event may be triggered when a file command is issued changing more than 10 Kbytes of data in the target file], and an exceeding of a maximum time threshold since a previous updating of the target file.

An embodiment of the computer readable code may further include program code for copying part of the target file into a temporary file, and program code for applying the saved update information to the temporary file. In one alternative embodiment, the code may provide for opening the temporary file and copying the data immediately following the saving of the update information. In a second alternative embodiment, the code may provide for opening of the temporary file and copying of data immediately preceding the updating of the target file.

An embodiment of the computer readable code may further include program code for applying the saved update information to the temporary file upon the occurrence of a merge event.

According to still further features in the described preferred embodiments. Some examples of merge events include: i) an issuing of a command to close the target file, ii) a closing down of an application that accessed the target file, iii) an occurrence of a condition dependent on a statistic related to a plurality of file commands [for example if eighty percent of the file commands issued to the target file change less than 10 Kbytes of data, then a termination event is triggered when a file command is issued changing more than 10 Kbytes of data in the target file] iv) an exceeding of the size of a delta file containing the update information over a maximum size threshold, v) a passing of level of activity of an operating system under a minimum activity threshold, vi) an exceeding of a maximum time threshold since a previous merge event, or vii) an issuing of a command to read the target file, in which case the applying of the saved update information to the temporary file would immediately precede emulation of execution of the read command. Thus, the updated data contained in temporary file would be returned as read information to the application that issued the read command. Alternatively, the applying of the saved file commands to the temporary file may immediately precede the updating of the target file.

According to still further features in the described preferred embodiments, the computer readable code may further include program code for detecting a termination event, and program code upon detection of the termination event for updating the target file with the saved update information and then for deleting the target file or the temporary file or a delta file containing the saved update information.

An embodiment of a method of using a wrapper program to protect a target file from data damage may include the step of the wrapper program transparently intercepting at least one file command operative to affect the target file, the wrapper program being independent of the application issuing the file command, and the step of the wrapper program saving update information pertaining to the at least one file command without altering the target file. The update information may contain the information necessary to execute the at least one file command. The method may also include the step of updating the target file with the update information.

According to still further features in the described preferred embodiments, in the time interval between the start of saving the update information until the end of updating the target file with the saved update information, every write command initiated by an application from a plurality of included applications and operative to affect the target file may be intercepted and saved.

According to still further features in the described preferred embodiments, updating the target file may include the substeps of copying at least part of the target file into a temporary file and applying the saved update information to the temporary file, and replacing all or part of the target file with the all or part of the temporary file, thus effectively updating the target file and deleting the temporary file.

According to still further features in the described preferred embodiments, the delta file containing the update information may be deleted subsequent to the step of applying the stored update information to the temporary file.

According to still further features in the described preferred embodiments, the step of updating may be performed upon occurrence one or more termination events. Examples of termination events include the following: i) an issuing of a command to close the target file, ii) a closing down of an application that accessed the target file, iii) an occurrence of a condition dependent on a statistic related to a plurality of file commands [for example, if for a period of one half hour an application accessed the target file at least once every five minutes, then the application not accessing the target file for a ten minute period is a termination event which triggers updating of the target file], iv) a passing of level of activity of an operating system under a minimum activity threshold, v) an exceeding of a maximum time threshold since the issuing of the previously saved file command, and vi) an exceeding of a maximum time threshold since a previous merge event.

According to still further features in the described preferred embodiments, the steps of intercepting a file command and saving update information may be contingent on a condition. For example intercepting and saving may only occur when the file command is issued by a application from a plurality of included applications, when the file command is issued by a application other than an excluded application, when the file command is operative to affect a file other than a temporary file, when the file command is operative to affect an included file type, when the file command is not operative to affect a file of an excluded file type or when the file command is operative to affect a file stored in an included storage device.

An embodiment of a system for reading data from a protected target file may include a processor configured to retrieve code of a wrapper application from a storage media and configured to execute the code. The wrapper application may include code for intercepting at least one file command issued by an application independent of the wrapper application, the file command operative to access the protected target file. The wrapper application may also include code for reading update information pertaining to the file command. The system may also include a first memory space for storing the protected target file and a second memory space for storing the update information.

According to further features in the described preferred embodiments, the wrapper application of the system for reading from protected target file may also include code for merging data from the protected target file with the update information into a temporary file. The temporary file may be the file containing the update information or the temporary file may be a separate temporary file. The temporary file and the update information may be stored on the same memory device as the target file or on a separate memory device.

An embodiment of a method of employing a wrapper program to read a protected target file may include the step of: intercepting by the wrapper program of at least one file command issued by an application, the file command operative to access the protected target file. The step of intercepting may be transparent to the application issuing the command. The method may also include the step of reading update information pertaining to the at least one file command and stored in a delta file. The delta file may be separate from the protected target file. The method further contains the steps of merging data from the target file with said update information and returning the merged data as a response (the response being the read results data) to the file command.

Terminology

The following terms are used in this application in accordance with their plain meanings, which are understood to be known to those of skill in the pertinent art(s). However, for the sake of further clarification in view of the subject matter of this application, the following explanations, elaborations and exemplifications are given as to how these terms may be used or applied herein It is to be understood that the below explanations, elaborations and exemplifications are to be taken as exemplary or representative and are not to be taken as exclusive or limiting. Rather, the terms discussed below are to be construed as broadly as possible, consistent with their ordinary meanings and the below discussion.

Merging: The process of, e.g., applying update information saved in a delta file to content copied from a target file into a temporary file (for example the temporary file may be the delta file or a separate temporary file).

Merge Event: An event that triggers a merging process. The event may be based on operating system events, such as a time base, a file system operation, or an indication from the wrapper application.

Updating a target file: The process of applying update information to the target file (see above). In a preferred embodiment (below), updating the target file is performed by copying a part of the target file to a temporary file, applying update information to the temporary file and replacing the part of the target file with the corresponding updated data in the temporary file.

Delta File: A temporary file that may be used for, e.g., accumulating update information related to intended changes in a target file.

Target File: A file that is the intended object of some action, operation, process etc., whether or not the file is in fact acted upon, affected, etc. Herein, "target file" may be used to refer to a file to be protected from data damage.

Interception: The process of monitoring, checking, altering and/or redirecting communications, e.g., between an application and a file system or between an application and an operating system.

Independent application: a first application is said to be independent of a second application if the first application is not contingent on the second application, i.e., does not require the second application in order to function as intended.

Wrapper: An application that monitors, intercepts and/or controls communications, e.g., between another application and the computer system or between one or more applications and a device.

Data storage device: A mechanism that is employed, e.g., by a data processing device to store data and from which data can be retrieved. A data storage device may be installable (for example a hard disk) or removable (for example a flash disk) or a removable medium (for example a compact disk or a magnetic tape).

Storing a command: For the sake of the current application, "storing a command in a delta file" may be used to refer to the operation of storing in the delta file update information pertaining to the command, the update information containing data necessary to apply the command at a future time.

BRIEF DESCRIPTION OF THE DRAWINGS

Various embodiments of a system and method for protecting a file from data damage are herein described, by way of example only, with reference to the accompanying drawings, where.

DESCRIPTION OF THE PREFERRED EMBODIMENTS

Figure 1:
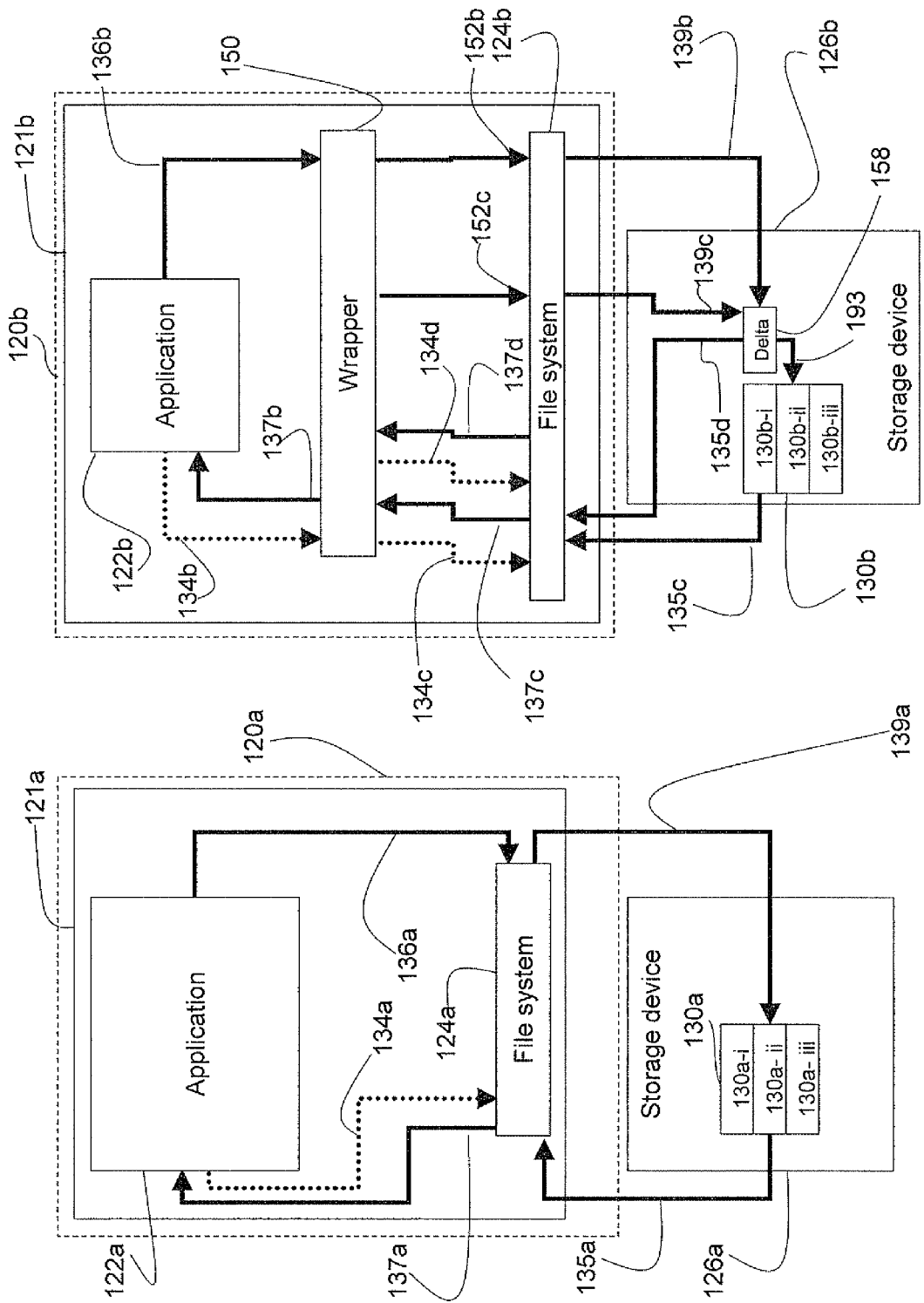
FIG. 1A is a schematic illustration of a prior art file storage system.
FIG. 1B is a schematic illustration of a first embodiment of a system for storing and protecting a target file.

The principles and operation of incremental transparent file updating according to various embodiments may be better understood with reference to the drawings and the accompanying description.

Various preferred embodiments exemplify a system that minimizes the risk of damaging a data file by minimizing the time that the file is kept open for writing, thus minimizing the risk that an unexpected event will occur while the file is open.

According to the preferred embodiments, applications implement read and write commands operative to access a protected data file (the target file), while the target file remains opened for reading only—a process that does not place the file at risk. A small service storage area, hereinafter called a delta file, is kept open and is used to store update information pertinent to file commands operative to affect one or more data files (target files) by one or more applications. Meanwhile reading and writing to the target file is emulated by a wrapper application. The wrapper application launches, monitors, intercepts and emulates basic elements in the communication between a functional application and a device or between a functional application and an operating system. Particularly, all the update information is accumulated in one or more delta files. When necessary (for example in order to emulate a reading the updated target file or as preparation for updating the target file) the stored update information and data read from the target file are merged into a temporary file. In the merge process, the temporary file is opened for writing and part or all of the target file is copied to the temporary file. The wrapper application then updates the temporary file based on the update information stored in the delta file.

Occasionally, the target file is also updated. When updating the target file, first the temporary file is closed and checked. Then part of the target file is replaced by the temporary file. This process protects the target file from data damage by minimizing the time that the target file is open and vulnerable to data damage. Furthermore, if a power failure occurs while the target file is being copied to the temporary file, then the target file remains intact. If a power failure occurs while part of the target file is being updated, the temporary file remains intact.

Both the file system and the functional application are blind to this wrapping process, which is transparent to both. The functional application functions exactly as when there is no wrapper application. The file system handles all file commands that reach the file system exactly as when there is no wrapper application.

Thus, a functional application programmer writes his program according to operating system standards without need to adapt the program for or even be aware of the file protection routine. Likewise, the programmer does not need to devise an application dependent routine to prevent data damage due to interruption while writing to storage.

Because the functioning of the wrapper program is transparent to the functional application and to the file system, the wrapper program can function independently of any particular functional application. Thus, the wrapper program can be sold separately as a stand-alone program for protecting files accessed by an arbitrary functional application. Since the wrapper program is independent of any particular functional application, the wrapper program can be included in a device driver or in an operating system that must respond to commands from any program that a user may install.

FIG. 1A shows a prior art data processing device 120a (such as a personal computer), having a processor 121a. Processor 121a is executing an application 122a (such as the Microsoft Windows® Notepad text editor) and a file management system 124a (such as FAT32 or NTFS). Application 122a and file management system 124a are illustrated inside of processor 121a to indicate that processor 121a is executing them.

Application 122a issues a file command, for example a read call 134a operative to access a file 130a. File 130a is stored in a portable data storage device 126a. Read call 134a is processed directly by file management system 124a. File management system 124a opens file 130a for reading and reads 135a data from file 130a and sends 137a the data to application 122a. At a later time, application 122a issues a second file command, a write call 136a operative to affect file 130a. As is known to those skilled in the art, a file does not generally reside in a single continuous set of memory addresses, but consists of a string of parts whose addresses are associated by a set of memory address pointers. Particularly file 130a is composed of three sections 130a-i, 130a-ii, and 130a-iii. When modifying a file it may be necessary to add information that does not fit in the memory currently allocated to the file. In such a case, it is not necessary to move the entire file to a new memory range, rather a new address is associated to the file and the new data are written in the new memory space. File management system 124a receives write call 136a, opens file 130a for writing and writes 139a data directly to file 130a. Such is the state of the art.

It is well known that valuable data can be lost from open files when a disruption occurs (for instance a power failure, or removal of portable data storage device 126a from a socket, or a software failure) while writing to a device such as portable data storage device 126a. Thus, file 130a of the system of FIG. 1A is in grave danger of data loss whenever an application such as application 122a issues a write command such as write command 136a.

FIG. 1B shows a first embodiment of a system for incremental transparent file updating, including a data processing device 120b (such as a personal computer), which contains a processor 121h running an application 122b (such as the Microsoft Windows Notepad text editor), a wrapper application 150 (also being executed on processor 121b), and a file management system 124b (such as FAT32 or NTFS). Application 122b and wrapper application 150 are represented in FIG. 1B inside of processor 121b to indicate that application 121b and wrapper application 150 are being executed by processor 121b.

Application 122b issues a file command, for example a write call 136b operative to affect a file 130b stored on a mobile storage device 126b. Application 122b is a standard application and all file commands (including write call 136b) are issued according to standard operating system protocols.

Target file 130b consists of three parts marked 130b-i, 130b-ii, and 130b-iii. Each part 130b-i, 130b-ii, and 130b-iii occupies a continuous string of memory addresses. The last byte of each parts 130b-i and 130b-ii is a pointer that points to the first address of the next part of target file 130b. The last bit of part 130b-iii is a stop bit representing the end of file 130b. Write call 136b is intercepted by wrapper application 150. In this example, write call 136b is operative to affect part 130b-ii. When wrapper application 150 detects write call 136b then wrapper application 150 checks to determine if write call 136b is to be intercepted and redirected. In the example of the embodiment of FIG. 1B, intercepting and redirecting write call 136b is contingent on fulfilling all of the following conditions: storage device 126b being of a type included amongst storage device types to be protected and the type of file 130b being included amongst file types to be protected. Since, in this example, during set up of wrapper application 150 a user specified that all portable storage devices should be protected and since the driver routine of portable storage device 126b defines portable storage device 126b as a portable storage device, therefore portable storage device 126b is an included storage device. Similarly, file 130b is of an included file type (a .txt file) therefore wrapper application 150 intercepts and redirects write call 136b.

Interception of a system call can be done in many ways known to those skilled in the art of programming as described in detail in computer programming text books such as "Loadable Kernel Module Programming and System Call Interception" by Nitesh Dhanjani and Gustavo Rodriguez-Rivera published in the Linux Journal 2006. Particularly, Wrapper application 150 prevents direct transmission of write call 136b to file management system 124b. Instead, wrapper application 150 instructs 152b file management system 124b to save update information pertinent to write call 136b in a delta file 158. File management system 124b writes 139b to delta file 158 the update information that is necessary to update target file 130b. In the example of FIG. 1B, update information includes data to add to target file 130b. It will be understood that update information may be editing information (for example instructions to move a piece of data from one location to another location within target file 130b or instructions to remove a piece of data from target file 130b) in which case it update information may include no new data for target file 130b. Alternatively, if delta file 158 does not exist, file management system will first create delta file 158 before writing 139b the data. Wrapper application 150 reports back to running application 122b as if target File 130b has been updated, thus emulating writing to target file 130b. During the emulated writing process, all writing has been to delta file 158. Target file 130b has not been modified and target file 130b has not even been opened for writing. It is emphasized that wrapper application 150 receives file commands according to standard operating system protocols and returns responses and data to application 122b exactly emulating operating system responses and data. Therefore the activity of wrapper application 150 is transparent to application 122b and therefore the activity of application 122b is according to operation standards and requires no modification due to the presence of wrapper application 150.

In the example of FIG. 1B, wrapper application 150 and application 122b are both being executed by a single processor 121h. Therefore in order to facilitate interception of commands, wrapper application wraps application 122b. "Wrapping" application 122b means that application 122b does not run independently. Rather, when a user requests to start application 122b, the request is passed through wrapper application 150. Wrapper application 150 invokes application 122b which runs "inside" of (is wrapped by) wrapper application 150 (that is to say all input and output to and from application 122b is via wrapper application 150).

At a later time, application 122b issues a second file command, a read call 134b. Read call 134b accesses a target file 130b and particularly at part 130b-ii. Wrapper application 150, in turn redirects read call 134b and emulates reading data from target file 130b by issuing a first read call 134c that accesses target file 130b. Read call 134c is processed by file management system 124b. File management system 124b opens file 130b for reading and reads 135c data from part 130b-ii of file 130b and sends 137c the read results data to wrapper application 150.

Wrapper application 150, then checks whether there exists a delta file 158 associated with target file 130b and whether the update information in delta file 158 applies to the range of read call 134b. In the example of FIG. 11B, delta file 158 exists and the range of read call 134b is contained in part 130b-ii of file 130b, and delta file 158 does contains update information for the range of read call 134b. Therefore, in order to fulfill read call 134b and return up to date read results data (the emulated read information) to application 122b it is necessary to merge the update information pertaining to file command 152b stored in delta file 158 with data from target file 130b. Thus, read call 134b constitutes a merge event that triggers merging of commands stored in delta file 158 with data stored in target file 130b. To execute the merging, wrapper application 150 issues second read call 134d that accesses delta file 158. Read call 134d is processed by file management system 124b. File management system 124b opens delta file 158 for reading and reads 135d data from delta file 158 and sends 137d the read results data to wrapper application 150.

The read results data from reads 135c-d are merged by the wrapper application 150 by applying the update information from read 135d to the data from read 135c, and the merged data are sent 137b to running application 122b emulating the return of read results data in response to the read request 134b. Thus, wrapper application has emulated reading updated data from target file 130. Application 122b in unaware that it has not communicated directly with file management system 124b.

At this point, the merged data from reads 135c-d constitute an updated version of part 130b-ii of target file 130b. Because activity on data processing device 120b is currently low in this example (there is plenty of free processing power so that updating target file 130 will not disturb any other process), wrapper application 150 updates target file 130b. It will be understood that it is not necessary to update target file 130b every time data are merged into a temporary file. To update target file 130b, wrapper application 150 first instructs 152c file system 124b to write 139c the merged data into delta file 158 (thus replacing the file command information previously stored in delta file 158). Then wrapper application 150 instructs file system 124b to update target file 130b by replacing 193 part 130b-ii with the merged data now stored in delta file 158. Since both target file 130b and delta file 158 already exist on the same storage device 126b, then replacing 193 is accomplished merely by changing the address pointers to incorporate delta file 158 into target file 130b in place of the part 130b-ii. Particularly in the example of FIG. 1B, the address of the pointer at the end of delta file 158 is set to point at the beginning of part 130b-iii of file 130b and then delta file 158 is closed. After wrapper application 150 verifies that delta file 130b has been closed, target file 130b is opened for writing and the pointer at the end of part 130b-i of target file 130b is set to point at the address of the beginning of delta file 158 and target file 130b is closed. Finally the memory space of part 130b-ii of delta file 130b is freed for use by a future write command. Since delta file 158 has been entirely reallocated to target file 130b therefore a memory pointer for the beginning of delta file 158 is removed from the directory of storage device 126b effectively deleting delta file 158. When there is a future write command, wrapper application 150 will need to create a new delta file.

In the example of FIG. 1B, merging data copied from target file 130b with commands stored in delta file 158 is triggered by read call 134b. Merging is also triggered whenever there is a termination event that makes it necessary to update target file 130b. Before updating target file 130b, the update information stored in delta file 158 and data stored in target file 130b are merged into a temporary file (as above, delta file 158 may serve as a temporary file). In this way the temporary file serves as a back up for target file 130b, if a power failure occurs while updating target file 130b thereby damaging target file 130b, the data of target file 130b can be recovered from the temporary file. Merging may also be triggered any time when there are available resources [memory space and processor time] after a time threshold has been exceeded since the last merging.

Many events may trigger the updating of a target file. Updating may be trigged periodically (for example, target file 130b may be updated once every 15 minutes) or updating may be triggered by a termination event. Examples of terminations events include a closing down of application 122b that has accessed the target file, or delta file 158 becoming too large (exceeding a size threshold), or a combination event (an example of a combination event is the combination of there being available resources (memory space and processor time) after a time threshold has been exceeded since the last updating).

It will be understood by one skilled in the art that delta file 158 may also consist of parts and a first part of delta file 158 may include a file command for part 130b-ii, while the second part of delta file 158 contains a file command for part 130b-iii. In such a case it is possible to merge part 130b-ii with the first part of delta file 130b and then update part 130b-ii keeping part 130b-iii of file 130b in its original state, leaving delta file 158 containing only the second part. Similarly it will be understood that the first or last part of a file can be changed by changing a file directory address pointer or a stop bit. Other existing means of exchanging parts of files will be understood by one skilled in the art.

In the embodiment of FIG. 1B, delta file 158 is stored on the same memory portable memory device 126b) as target file 130b. It is to be understood that delta file 158 could be part of a temporary file residing in a fast volatile memory of data processing device 120b or in a hard disk or in a non-volatile memory of data processing device 120b or in another portable storage device or in a removable medium (for example a writable compact disk). Similarly, in the embodiment of FIG. 1B, wrapper application 150 merges the data of reads 135c-d into a space a volatile memory of computing device 120b thus effectively redirecting read call 134b to the space containing the merged data. It is understood that merged information could be stored on any memory device for example in a hard disk or in a non-volatile memory of data processing device 120*b* or in another portable storage device or in a removable medium (for example a writable compact disk).

Figure 2:
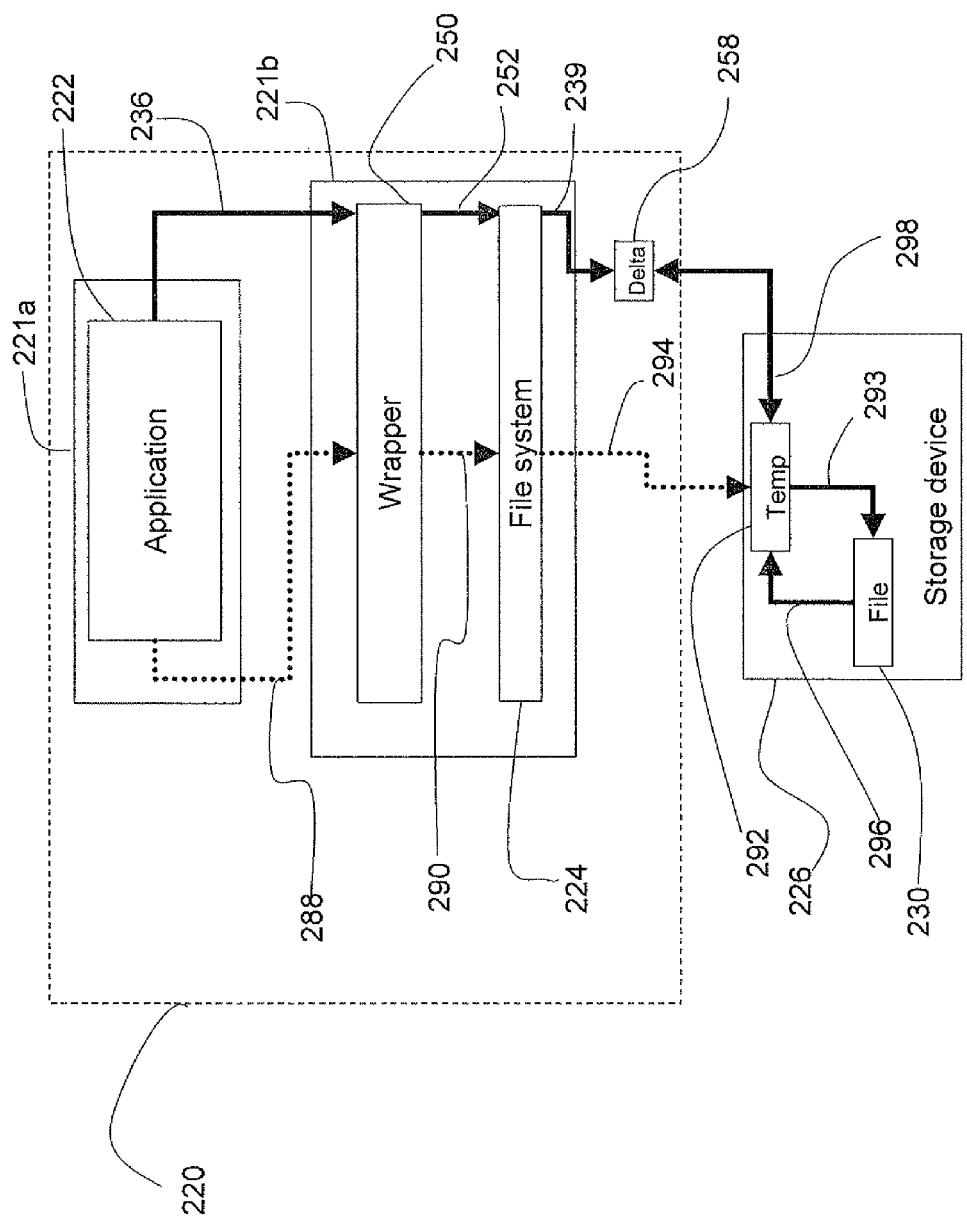
FIG. 2 is a schematic illustration of a second embodiment of a system for storing and protecting a target file.

FIG. 2 shows a data processing device 220 (such as a network of parallel processors), running an application 222 (such as the Microsoft Visual Studio®), a wrapper application 250, and a file management system 224 (such as FAT32 or NTFS).

Application 222 issues a file command, a write call 236 operative to affect file 230 stored in a storage device 226. Write call 236 is intercepted by wrapper application 250. In the embodiment of FIG. 2, wrapper application 250 is being executed by a processor 221*b* while application 222 is being executed on a separate processor 221*a*, a processor in the network of data processing device 220. Wrapper application 250 redirects write call 236 by instructing 252 file management system 224 to save update information pertaining to write call 236 in delta file 258. File management system 224 writes 239 to delta file 258 only the update information that is needed to update target file 230. The update information pertaining to write call 236 is saved to delta file 258 while target file 230 remains unchanged. Wrapper application 250 reports back to running application 222 as if target file 230 has been updated, thus emulating writing to file 230. In the example of FIG. 2 delta file 258 is stored in a volatile memory of data processing device 220.

Later upon detecting the occurrence of a "termination event" 288, (in the example of FIG. 2, the termination event 288 is the closing down of application 222, which had issued write call 236 operative to affect target file 230), wrapper application 250 updates target file 230. Because delta file 258 is not stored on the same storage device 226 as file 230, it is not possible to update target file 230 by copying data into delta file 258, and applying the update information to the copied data in delta file 258 and changing pointers (as in the example of FIG. 1B). In order to update target file 230 wrapper application 250 must first merge stored update information from delta file 258 with data from target file 230 into a temporary file 292 on storage device 226. Thus, wrapper application 250 instructs 290 files system 224 to create 294 temporary file 292, to copy 296 contents from target file 230 into temporary file 292 and to apply 298 the file commands (update information pertaining to write call 236) stored in delta file 258 to temporary file 292. Once merging ends successfully, wrapper application 250 instructs file system 224 to close temporary file 292 and to replace 293 target file 230 with temporary file 292. Because both target file 230 and temporary file 292 already exist on the same storage device 226, replacing 293 is accomplished merely by removing the pointer to the temporary file 292 from the from the file directory and changing the pointer (the stored address) of target file 230 to the address of temporary file 292 (thus effectively updating target file 230 and deleting the temporary file 292).

In the example of FIG. 2, because application 222 is not being executed by the same processor 221 as wrapper application 250, wrapper application 250 cannot wrap (control all input and output of) application 222. Therefore wrapper application 250 wraps file system 224 such that all calls to file system 224 pass through wrapper application 250. Thus, wrapper application 250 effectively wraps storage device 226.

It is understood that file 230 may be accessed by multiple applications. Thus, write commands from each application are intercepted by wrapper application 250 and redirected to delta file 258. Similarly an attempt to read file 230 by any application will be intercepted and trigger a merge event. It will be understood to one familiar in the art that, unlike prior art single application file protection schemes (such as that used by Microsoft® Word) which must lock access to protected files, wrapper application 250 permits multiple applications simultaneous read-write access to target file 230.

The possibility of locking file access and file access conflicts will also be understood by those familiar with the prior art. Particularly in the embodiment of FIG. 1 where wrapper application 150 wraps only one or more particular applications (for example application 222) but does not wrap file system 124*b*, it is possible for a separate application (not wrapped by wrapper application 150) to access file 130*b* not via wrapper application 150. In such cases, prior art solutions (such as locking file 130*b*) exist (for example as described in *Advanced Windows* 3$^{rd}$ *Edition* by Jeffery Richter, Microsoft Press, Redmond Wash., 1997, and particularly pp 711-715).

It is understood that in an alternative embodiment data can be copied 296 from target file 230 to temporary file 292 as part of intercepting the first write call 236. In such an embodiment, temporary file 292 would be a constantly updated version of target file 230 and updating target file 230 would consist only of closing temporary file 292 and moving the address pointer of target file 230 to the address of temporary file 292.

In the example of FIG. 2, processors 221*a-b* are components of the multiprocessor network of data processing device 220. It is understood by one skilled in the art that alternative processor configurations exist and are compatible with various embodiments of a system and method to protect a file. For example, processor 221*b* could be an internal component of data storage device 226 or processor 221*b* could be a component of dedicated file system server on a network.

Figure 3:
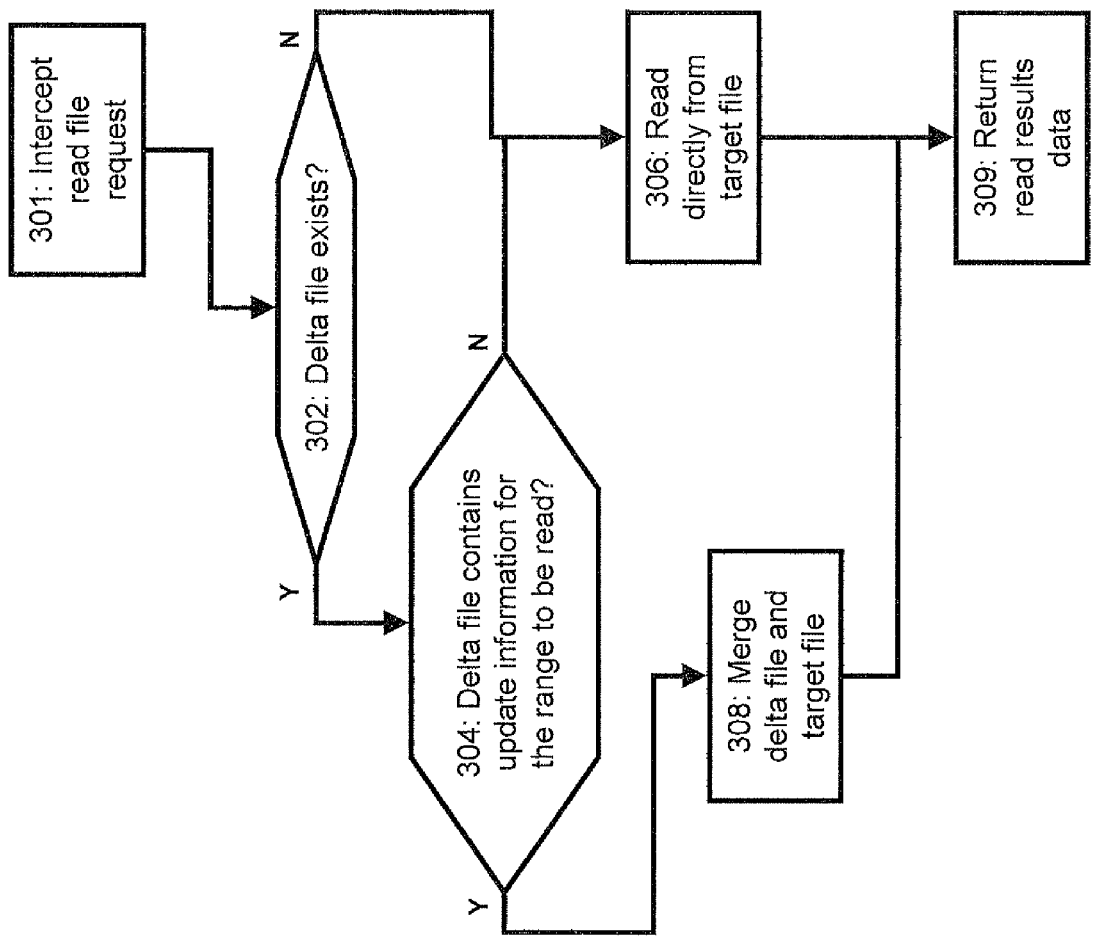
FIG. 3 is a flow chart illustrating interception and redirection of a read command and emulation of reading a target file.

FIG. 3 shows a simplified flow chart of the reading process of the embodiment of FIG. 2. A read command from application 222 is intercepted 301 by wrapper application 250. Wrapper application 250 first tests 302 if there exists a delta file containing update information for file 230 at which the read command is directed. If no delta file exists, then control is returned to file management system 224, which processes the read command normally according to the prior art, reading 306 the requested range directly from target file 230 and returning 309 read results data to requesting application 222.

If testing 302 returns a positive result (that there exists a delta file 258 containing update information for file 230 which is to be read), then wrapper application 250 further checks 304 if the update information of delta file 258 is operative to affect the range of the read command. If there is no update information for the requested range, then control is returned to file management system 224 which processes the read command normally according to the prior art by reading 306 the requested range directly from target file 230 and returning 309 data to requesting application 222.

If testing 304 returns a positive results (delta file 258 contains update information for the range of data to be read), then wrapper application 250 merges 308 the data of the range to be read from the delta file and update information from the target file (by copying the range to be read from target file 230 to temporary file 292 and applying the update information from delta file 258 to the copied data in temporary file 292), and returns 309 the merged data from the requested range to requesting application 222.

Figure 4:
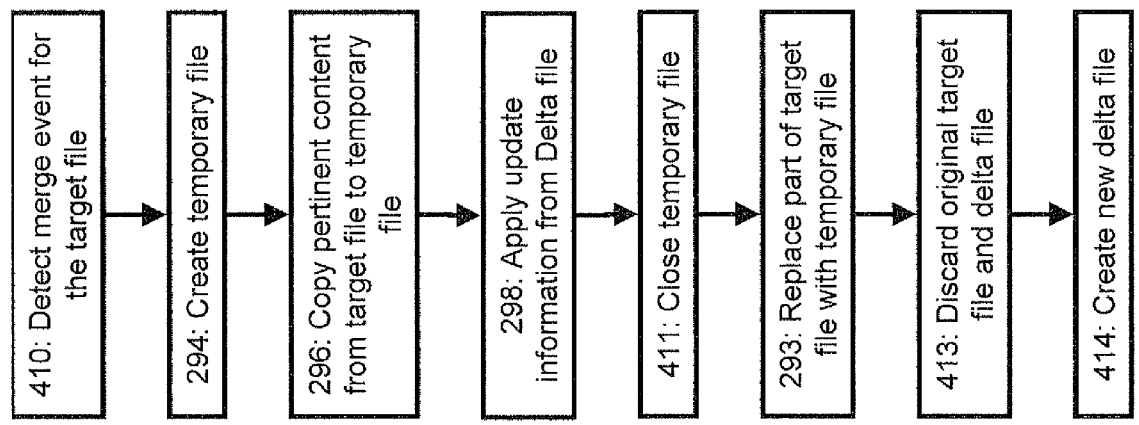
FIG. 4 is a flow chart illustrating applying update information to a temporary file.

FIG. 4 shows a simplified flow chart of a merge process according to the embodiment of FIG. 2. Wrapper application 250 detects 410 an occurrence of termination event 288 that indicates the need to start a merge process (before updating target file 230). Particularly in the example of FIG. 4, a user closes down application 222, which has issued at least one command to modify target file 230 in the current session. When wrapper application 250 detects that the operating system of device 220 is closing down application 222 then wrapper application 250 commands 290 file system 224 to open 294 an empty temporary file 292 and to copy 296 content from target file 230 into temporary file 292. Particularly in the example of FIG. 4, the data to be copied to temporary file 292 are the data range that was to be accessed in write call 236. Wrapper application 250 further commands file system 224 to apply 298 update information stored in delta file 258 to temporary file 292. Particularly in the example of FIG. 4, delta file 258 contains update information pertinent to write call 236. Once the update information stored in delta file 258 has been applied 298 to temporary file 292, wrapper application 250 issues a command to close 411 temporary file 292 and a command to replace 293 part of target file 230 with temporary file 292 by changing the address in the pointer for the part of target file 230 to the address of temporary file 292. Wrapper application 250 then proceeds to discard 413 the replaced part of target file 230 and delta file 258 by instructing file system 224 to report the memory space of the replaced part of target file 230 and delta file 258 as free space since they are no longer needed.

If a merge event is triggered while a separate application is writing to delta file 258, then the merge process is suspended until the write operation is completed. Should there be a new write call to target file 230 after the completion of the merge process, then a new delta file will be opened 414. Alternatively, a new delta file may automatically be opened 414 immediately after a merge process.

Alternatively or in addition to the closing down of application 222, other examples occurrences that are interpreted as a merge event include (1) an issuing of a command to close target file 230, (2) an occurrence of a condition dependent on a statistic related to a plurality of file commands for example when an application has been accessing data on storage device 226 on average once every minute over a predefined period of one hour and afterwards there passes a time interval thirty times the average access interval (30 times 1 minute equals 30 minutes) in which the application does not access storage device 226 then a merge process is automatically triggered, (3) an exceeding of a size of delta file 258 over a maximum size threshold (for example if the stored update information in delta file 258 exceed 100 kilobytes of information), (4) a passing of level of activity of an operating system under a minimum activity threshold (for instance when the memory and processor are less than 50% occupied over a 10 second period) or (5) an exceeding of a maximum time threshold since a prior merge event (for example wrapper application 250 may have a rule that whenever there passes for any file a 15 minute period since a previous merge event then a new merge process is begun. Another occurrence that may trigger a merge event is an issuing of a command to read target file 230 (as explained in the description of FIG. 3, in order to read updated data it is necessary to merge data from target file 230 with the update information of delta file 258).

Figure 5:
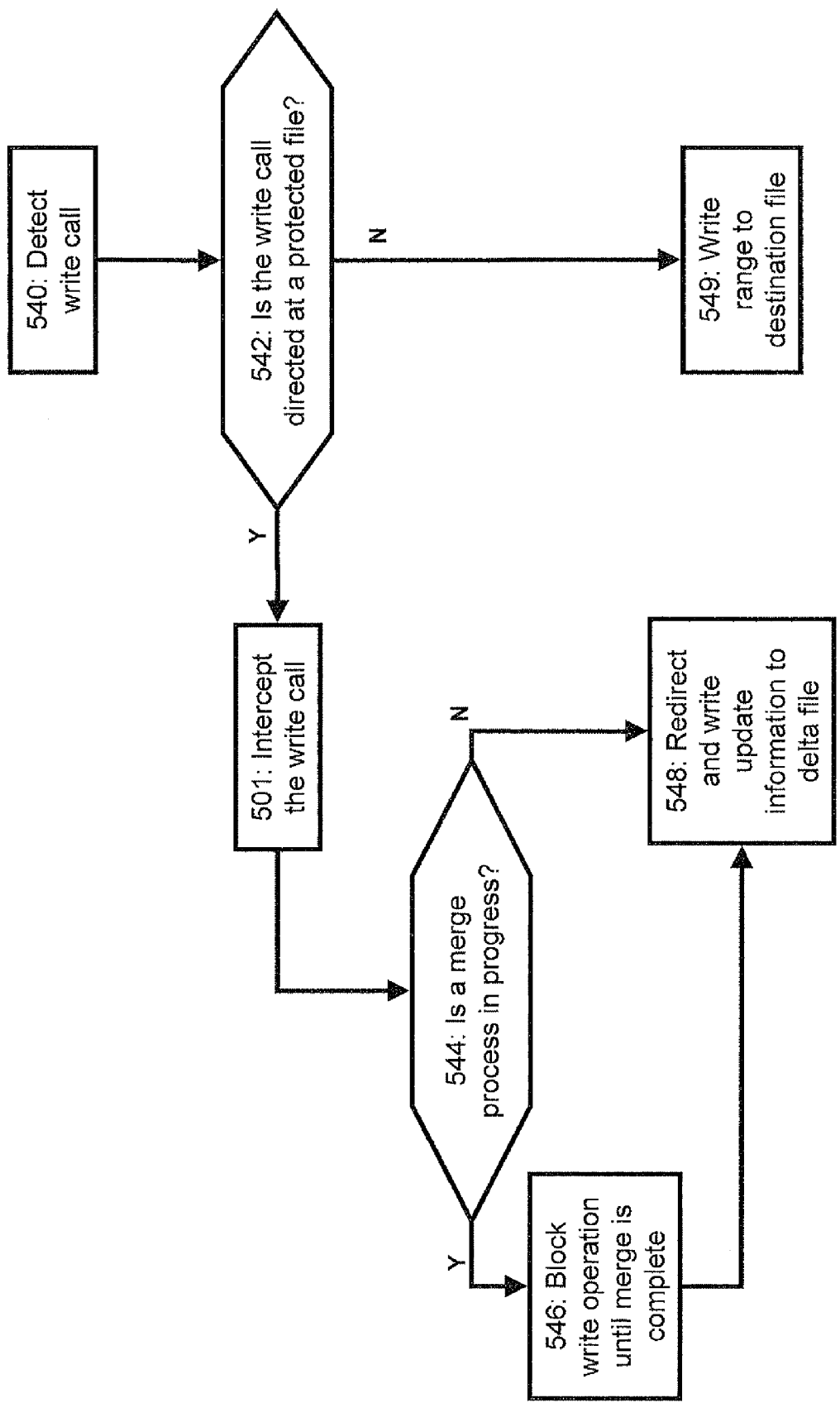
FIG. 5 is a flow chart illustrating the process of intercepting and redirecting a write call to a target file.

FIG. 5 shows a simplified flowchart of a writing process. Application 222 issues a write call 236 to file system 224. Wrapper application detects 540 write call 236 and checks 542 to determine if file 230 (to which the write command is directed) is a file to be protected. Specifically in the example of FIG. 5 storage device 226 is a protected storage device. More particularly target file 230 is to be protected because target file 230 fulfills the following conditions. Target file 230 is stored on device 226, which is a removable portable storage device that is subject to sudden unpredictable disruption due to premature removal. Therefore wrapper application 250 protects all permanent unprotected user files in storage device 226. More specifically, by default all write commands to storage device 226 are intercepted and redirected unless the application issuing the write command is an excluded application (for example Microsoft® Word is an excluded application because Word has internal file protection and backup, also Adobe Acrobat® reader is excluded because Adobe Acrobat® reader does not store any modified user files) or unless the write command is operative to affect an excluded file type (for example a temporary file of type .tmp are excluded since data loss from a temporary files is seldom serious). When application 222 is an excluded application or the file to which the write command is directed is an excluded file type or the file at which the write command is directed is not in storage device 226 then file system 224 writes directly 549 to the file.

Alternatively, the conditions for intercepting and redirecting a file command may include one or more of the following conditions: the file command being issued by an included application (an included application is an application that is included on a list or group of applications whose file commands are to be intercepted by wrapper application 250), the file command being issued by an application that is not an excluded application (an excluded application is an application belonging to a list or group of applications whose file commands are not to be intercepted), the file command being operative to affect a file that is not a temporary file, the file command being operative to affect an included file type (an included file type is a file having a type that is included in a list or group of files types to be protected), the file command being operative to affect a file that is not of an excluded file type (an excluded file type is a file having a type that is in a list or group of files types not to be protected) and the file command being operative to affect a file stored in a protected storage device. Contingent on the fulfillment of one or more of the above conditions, a wrapper applications will either intercept 501 and redirect 548 a write call, or wrapper application 250 will allow a file system to write directly 549 to a file as described above for a prior art file system of FIG. 1A.

In the example of FIG. 5, file 230 is a .txt file (which is not an excluded type) in storage device 226 (which is an included storage device) and application 222 is Microsoft Visual Studio® (which is not an excluded application). Therefore wrapper application intercepts 501 write call 236. Wrapper application 250 then checks 544 whether or not a merge operation for file 230 is in process. If a merge operation is in progress, the write command process is suspended 546 until the merge operation is completed. When the merge operation is complete, the suspended write operation is resumed and the content of the write command is redirected 548 by saving to delta file 258 the update information pertaining to the write call 236. If no merge operation is in progress, wrapper application 250 redirects 548 write call 236 and saves update information to delta file 258. If a merge event is triggered while writing to delta file 258, the merge event is suspended until the write operation is completed.

In sum, although various embodiments and preferred versions thereof have been described in considerable detail, other versions are possible. Therefore, the spirit and scope of the appended claims should not be limited to the description of the preferred versions contained herein.

What is claimed is:

1. A storage device for storing a target file, the storage device comprising:
a processor configured, in retrieving and executing program code of a wrapper application configured to protect data of the target file from damage, to:
intercept at least one file command issued by another application, said at least one intercepted file command being operative to update the target file, and said wrapper application being independent of said other application;

save update information pertaining to said at least one intercepted file command;

detect a termination event after completion of saving the update information; and instruct a file system to copy a part, but not all, of the target file into a temporary file to store a copy of the part of the target file in the temporary file, to modify the temporary file by applying the update information to the copied part of the target file in the temporary file, to close the temporary file prior to updating the target file, and to update the target file according to the modified temporary file;

a first memory space for storing the target file; and a second memory space for storing said update information, wherein the termination event results from a condition related to an update status of the target file, wherein the update status includes exceeding a time threshold since a previous update of the target file, and wherein the processor is further configured to update the target file by replacing the part of the target file with the updated temporary file.

2. The storage device of claim 1, further comprising a nonvolatile memory, and wherein said first memory space resides in the nonvolatile memory.

3. The storage device of claim 2, wherein said second memory space resides in one or more of said nonvolatile memory of said storage device, a separate nonvolatile memory of said storage device, and a volatile memory of said storage device.

4. The storage device of claim 1, further comprising a volatile memory, wherein said second memory space resides in the volatile memory.

5. The storage device of claim 1, wherein said update information includes only data pertaining to said at least one file command.

6. The storage device of claim 1, further comprising a third memory space for storing the temporary file.

7. A non-transitory computer readable storage medium having computer readable code embodied thereon, the computer readable code comprising program code executable by a processor of a data storage device, the program code comprising:

program code corresponding to a wrapper application configured to protect data of a target file from damage and for intercepting, by the data storage device, at least one file command issued by an application, said at least one intercepted file command operative to update a the target file, said program code being independent of said application;

program code for saving, by the data storage device, update information pertaining to said at least one intercepted file command without modifying the target file;

program code for detecting, by the data storage device, a termination event after completion of saving the update information;

program code for copying, by the data storage device, a part, but not all, of the target file into a temporary file to store a copy of the part of the target file in the temporary file;

program code for modifying, by the data storage device, the temporary file by applying the update information to the copied part of the target file in the temporary file;

program code for closing, by the data storage device, the temporary file prior to updating the target file; and program code for updating, by the data storage device, the target file according to the modified temporary file and with said update information upon detection of said termination event, wherein said termination event results from a condition related to an update status of the target file, wherein the update status includes exceeding a time threshold since a previous update of the target file, and wherein updating the target file includes replacing the part of the target file with the modified temporary file.

8. The non-transitory computer readable storage medium of claim 7, wherein said program code for intercepting and said program code for saving make said intercepting and said saving contingent upon one or more of said application being one of a plurality of included applications, said application being other than an excluded application, said at least one file command being operative to update a file other than a temporary file, said at least one file command being operative to update a file belonging to an included file type, said at least one file command being operative to update a file not belonging to an excluded file type and said at least one file command being operative to update a file stored in an included storage device.

9. The non-transitory computer readable storage medium of claim 7, wherein said at least one file command includes every write command operative to update the target file after said program code for saving is executed and until said program code for updating is executed.

10. The non-transitory computer readable storage medium of claim 7, wherein the computer readable code further comprises:

program code for applying said update information to said temporary file upon occurrence of a merge event.

11. The non-transitory computer readable storage medium of claim 10, wherein said merge event includes one or more of:

an issuing of a command to close the target file, a closing down of an application that accessed the target file, an occurrence of a condition dependent on a statistic related to a plurality of file commands, an exceeding of a size of a delta file containing said update information beyond a maximum size threshold, a passing of level of activity of an operating system under a minimum activity threshold, a closing down of said application, an exceeding of a maximum time threshold since a previous merge event, and an interception of a command to read the target file and wherein execution of said code for applying precedes returning read results data in response to said command to read.

12. The non-transitory computer readable storage medium of claim 10, wherein the computer readable code further comprises:

program code for detecting the termination event, and program code for deleting one or more of the target file, said temporary file and a delta file containing said update information upon detection of said termination event, said deleting being subsequent to said applying and updating.

13. A method of employing a wrapper program at a storage device to protect a target file from data damage, the method comprising, at the storage device:

intercepting by the wrapper program at least one file command issued by an application, said at least one file command operative to update the target file, said intercepting being transparent to said application, wherein the file command comprises a write command to write data to the target file, and wherein updating the target file includes copying a part, but not all, of the target file into a temporary file;

instructing a file system to save update information pertaining to said at least one file command in a delta file without altering the target file;

instructing the file system to detect a termination event after completion of saving the update information;

instructing the file system to merge the saved update information with data from the target file to generate merged data;

instructing the file system to write the merged data into the temporary file;

instructing the file system to close the temporary file prior to updating the target file; and updating the target file with the merged data from the temporary file, wherein updating the target file includes replacing the part of the target file with the temporary file, wherein the termination event results from a condition related to an update status of the target file, and wherein the update status includes exceeding a time threshold since a previous update of the target file.

14. The method of claim 13, wherein the wrapper program is configured to:
determine that the file command is a write command; and
determine that the write command is to be intercepted and redirected.

15. The method of claim 13 further comprising deleting said delta file containing said update information subsequent to applying said update information to said temporary file.

16. The method of claim 13, wherein said updating is performed upon occurrence of one or more of:
an issuing of a command to close the target file,
a closing down of said application,
a closing down of an application that accessed the target file,
an occurrence of a condition dependent on a statistic related to a plurality of file commands,
a passing of a level of activity of an operating system under a minimum activity threshold, and
an exceeding of a maximum time threshold since an issuing of said at least one file command.

17. The method of claim 13, wherein said intercepting and said saving are contingent on one or more of said application being one of a plurality of included applications, said application being other than an excluded application, said at least one file command being operative to update a file other than a temporary file, said at least one file command being operative to update an included file type, said at least one file command being operative to update a file other than an excluded file type and said at least one file command being operative to update a file stored in an included storage device.

18. A storage device for reading data from a protected target file and protecting data of the protected target file from damage, the storage device comprising:
a processor configured, in retrieving and executing program code of a wrapper application configured to protect data of the protected target file from damage, to:
intercept at least one file command issued by an application independent of said wrapper application, said at least one intercepted file command operative to access the protected target file,
read update information pertaining to said at least one intercepted file command,
copy a part, but not all, of the protected target file into a temporary file,
detect a termination event after completion of saving update information pertaining to said at least one intercepted file command;
close the temporary file prior to updating the protected target file; and
modify the temporary file by applying the update information to the copied part of the protected target file in the temporary file to generate an updated temporary file;
a first memory space for storing the protected target file; and
a second memory space for storing said update information,
wherein the termination event results from a condition related to an update status of the target file, wherein the update status includes exceeding a time threshold since a previous update of the target file, and wherein updating the target file includes replacing the part of the target file with the updated temporary file.

19. The storage device of claim 18, wherein said processor is further configured to update the protected target file according to the updated temporary file.

20. A method of employing a wrapper program at a storage device to read a protected target file, the method comprising, at the storage device:
intercepting by the wrapper program at least one file command issued by an application, said at least one intercepted file command being operative to access the protected target file and to update the protected target file by copying a part, but not all, of the protected target file into a temporary file, said intercepting being transparent to said application, wherein the wrapper program is independent of the application, and wherein the wrapper program is configured to protect data of the protected target file from damage;
reading update information pertaining to said at least one intercepted file command stored in a delta file, said delta file being separate from the protected target file;
detecting a termination event pertaining to the at least one intercepted file command;
merging, in the temporary file, data from the protected target file with said update information stored in the delta file in response to a merge event;
closing the temporary file prior to updating the protected target file; and
returning a result of said merging as a response to said at least one file command prior to updating the protected target file with the merged data,
wherein the termination event results from a condition related to an update status of the target file, and wherein the update status is dependent on a statistic related to a plurality of file commands.

21. A data storage device, comprising:
a first memory space for storing a protected target file; and
a second memory space for storing a non-protected temporary file, wherein the non-protected temporary file includes data copied from a part, but not all, of the protected target file and includes update information pertaining to a file command operative to update the protected target file, wherein the non-protected temporary file is closed prior to updating the protected target file, wherein the update information is received from a wrapper application in response to the wrapper application intercepting the file command issued by an application that is independent from the wrapper application, wherein the intercepted file command is operative to update the protected target file, and wherein the wrapper application is configured to protect data of the protected target file from damage, wherein the update information is received in response to detecting a termination event, wherein the termination event results from a condition related to an update status of the target file, wherein the update status is dependent on a statistic related to a plurality of file commands, and wherein updating the protected target file includes replacing the part of the protected target file with the non-protected temporary file.

22. The data storage device of claim 21, wherein the application issues read and write file commands operative to access the protected target file while the protected target file remains open for reading.

23. The data storage device of claim 21, wherein the protected target file and the non-protected temporary file are merged by moving address pointers to incorporate the non-protected temporary file into the protected target file.

24. The data storage device of claim 23, wherein moving the address pointers comprises removing a pointer to the non-protected temporary file from a file directory and changing a pointer of the protected target file to an address of the non-protected temporary file.

25. A data storage device, comprising:
a first memory space for storing a target file; and
a second memory space for storing a temporary file that includes a part, but not all, of the target file and that includes update information pertaining to a file command and for updating the temporary file based on the update information,
wherein the update information is received from a wrapper application in response to the wrapper application intercepting the file command issued by an application that is independent from the wrapper application, the wrapper application configured to protect data of the target file from damage,
wherein the update information is received in response to detecting a termination event,
wherein the termination event results from a condition related to an update status of the target file,
wherein the temporary file is closed prior to updating the target file;
wherein the update status is dependent on a statistic related to a plurality of file commands, and
wherein the part of the target file is replaced with the updated temporary file in response to a read command.

26. The data storage device of claim 25, wherein the first memory space resides in a nonvolatile memory of the data storage device and wherein the second memory space resides in a volatile memory of the data storage device.

27. The data storage device of claim 25, wherein the wrapper application is executed by a processor that is external to the data storage device.

28. A method, comprising:
in a data storage device, performing:
storing a target file in a first memory space;
storing a delta file that includes update information pertaining to the target file in a second memory space;
copying a part, but not all, of the target file into a temporary file;
applying the update information to the copied part of the target file in the temporary file to produce an updated temporary file;
detecting a termination event after applying the update information to the copied part of the target file;
closing the temporary file prior to updating the target file; and
updating the target file with the updated temporary file,
wherein the update information is received from a wrapper application in response to the wrapper application intercepting a file command issued by an application that is independent from the wrapper application, wherein the file command comprises a command to update the target file and wherein the wrapper application is configured to protect the target file from damage,
wherein the termination event results from a condition related to an update status of the target file,
wherein the update status is dependent on a statistic related to a plurality of file commands, and
wherein the part of the target file is replaced in response to a read command.

29. The method of claim 28, wherein the updating of the target file is performed in response to the termination event.

30. The method of claim 28, wherein the copying and the applying of the update information are performed in response to a merge event.

* * * * *

UNITED STATES PATENT AND TRADEMARK OFFICE
CERTIFICATE OF CORRECTION

PATENT NO. : 8,589,341 B2  Page 1 of 1
APPLICATION NO. : 11/944639
DATED : November 19, 2013
INVENTOR(S) : Ittai Golde et al.

It is certified that error appears in the above-identified patent and that said Letters Patent is hereby corrected as shown below:

In the Title page, Item (75), delete "Kobi Ben Tzi", and substitute the following:

--Kobi Ben Tzvi--.

In the Title page, Item (75), delete "Itzhak Pomerantz", and substitute the following:

--Yitzhak Pomerantz--.

In the Claims,

Column 17, Claim 7, Line 52, "intercepted file command operative to update a the target" should be --intercepted file command operative to update the target--.

Signed and Sealed this
Fifteenth Day of March, 2016

Michelle K. Lee
*Director of the United States Patent and Trademark Office*